United States Patent [19]
Risse

[11] Patent Number: 6,007,604
[45] Date of Patent: Dec. 28, 1999

[54] NOZZLE ASSEMBLY FOR A SCRUBBING COLUMN

[75] Inventor: Theo Risse, Werne, Germany

[73] Assignee: Lurgi Lentjes Bischoff GmbH, Essen, Germany

[21] Appl. No.: 09/134,310

[22] Filed: Aug. 14, 1998

[30] Foreign Application Priority Data

Aug. 28, 1997 [EP] European Pat. Off. .............. 97114906

[51] Int. Cl.⁶ .................................................. B01D 47/06
[52] U.S. Cl. ................... 95/13; 95/187; 95/235; 96/244; 96/322; 96/417; 261/115; 261/116; 261/117
[58] Field of Search ............................. 96/243, 255, 417, 96/266, 322, 244; 95/149, 187, 235, 8, 13; 261/115, 116, 117, 118

[56] References Cited

U.S. PATENT DOCUMENTS

| 1,430,696 | 10/1922 | Smith ......................................... 95/149 |
| 5,173,093 | 12/1992 | Johnson et al. ........................... 96/243 |
| 5,271,873 | 12/1993 | Nelson et al. ............................ 261/116 |
| 5,620,144 | 4/1997 | Strock et al. ............................. 239/557 |

FOREIGN PATENT DOCUMENTS

| 0 524 729 | 1/1993 | European Pat. Off. . |
| 2 297 705 | 8/1996 | United Kingdom . |

Primary Examiner—Duane S. Smith
Attorney, Agent, or Firm—Herbert Dubno

[57] ABSTRACT

A nozzle arrangement for a scrubbing column for a flue gas in desulfurization, in which the scrubbing column has a sump, a baffle-free zone above the sump and a nozzle arrangement above the absorption zone. The nozzles, preferably by selective connection of intermediate pipe sections are connected to a branch pipe system extending from a distributor. Flow density profiles are formed in predetermined cross sectional planes of the scrubbing column by the spray cones of the nozzles. In each of these cross sectional planes, the flow density profiles of different spray cones are superimposed on one another. The flow density profiles of different cross sectional planes are superimposed upon projection of them onto a one of the planes to form a flow density complete profile in this one plane over the entire cross section of the scrubbing column. The flow density complete profile is compared with a predetermined value and, upon deviation of the flow density complete profile from the predetermined value, a position of at least one of the nozzles is adjusted. The steps are repeated until the flow density complete profile for the cross section of the scrubbing column has an approximately constant value up to a wall region of the cross section.

7 Claims, 7 Drawing Sheets

NOZZLE ASSEMBLY FOR A SCRUBBING COLUMN

FIELD OF THE INVENTION

My present invention relates to a nozzle assembly for a scrubbing column and, more particularly, to a nozzle system for use in a scrubbing column intended primarily for the desulfurization of flue gases and can have a diameter of several meters.

BACKGROUND OF THE INVENTION

For the scrubbing of flue gases and, particularly, for the desulfurization of a flue gas by the treatment thereof with a scrubbing or absorptive liquid in a scrubbing column, it is known to provide the scrubbing column as a tower with a sump for collecting the scrubbing liquid, an absorption zone which may be free from baffles and packing and in which the gas is contacted with the liquid, and at least one nozzle plane above the absorption zone and provided with a manifold or distribution system for the scrubbing liquid, branch pipes and nozzles which dispense the scrubbing liquid into the gas.

The spray cones of the nozzles can overlap and the nozzles themselves may be connected to the branch pipes by intermediate pipe segments which run laterally of the branch pipes.

The gas can be passed in a uniform with the scrubbing liquid, i.e. in the same direction as the scrubbing liquid or in a counterflow to the scrubbing liquid. In the preferred state the gas passes upwardly while the nozzle plane is located at an upper portion of the scrubbing column.

Nozzle arrangements of the prior art encompass one or more nozzle planes, each of which has a distributor or manifold which is located in an axis of symmetry of the scrubbing column cross section and extends over the entire cross section of the scrubbing column. To the right and to the left branch lines are connected to the manifold, usually equidistantly so that these branch lines are disposed symmetrically. The connecting segments are likewise symmetrically disposed on the branch lines and have downwardly-turned ends which are formed with the nozzles. This nozzle distribution (see the U.K. Patent document 2 297 705) has a nozzle arrangement with overlapping spray cones and the nozzles distributed as much as possible uniformly over the cross section of the scrubbing column. The goal, of course, with these earlier systems is the greatest uniformity in the distribution of the spray over the cross sectional area of the column from a geometric view point.

It has been found from concentration measurements in the scrubbing gas stream above the nozzles that, in spite of a uniform distribution of the spray nozzles over the area of the scrubbing column cross section, there are locally higher toxic or noxious gas concentrations. The scrubbing gas stream appears to have tracks through the absorption zone which are not sufficiently contacted by the scrubbing liquid and in which noxious or toxic components, for example, sulfur-containing components, are not adequately removed by absorption.

As a consequence, the overall absorption efficiency of a scrubbing column is limited by the fact that there are local regions of greater and lesser scrubbing effectiveness. If a predetermined degree of absorption or absorption efficiency is not achieved, the length of the absorption zone must be increased and/or additional nozzle planes must be provided to increase the amount of the scrubbing liquid dispersed into the gas stream. Both of these expedients are expensive and are associated with increased operating gases for the additional pumping energy which is necessary. In many cases, moreover, existing scrubbing columns cannot be retrofit ted to achieve improved results.

OBJECT OF THE INVENTION

It is the principal object of the present invention to provide a scrubbing nozzle assembly for a scrubbing column which can ensure a uniform scrubbing of the gas stream over the entire cross section of the scrubbing column and, especially, a scrubbing nozzle arrangement which precludes the formation of tracks through the scrubbing column at which there is reduced absorption or scrubbing efficiency.

Another object of the invention is to provide an improved nozzle assembly for a scrubbing column whereby drawbacks of earlier systems are avoided.

It is also an object of this invention to provide a nozzle assembly for a scrubbing column which can be formed in existing scrubbing units, thereby allowing retrofitting of such units to improve the scrubbing efficiency, or effectiveness.

SUMMARY OF THE INVENTION

These objects and others which will become apparent hereinafter are attained, in accordance with the invention in a nozzle assembly in which the nozzle assembly forms spray cones which overlap in a plurality of cross sectional planes of the apparatus so that within each of these planes, predetermined distributions of the liquid contacting the gas are achieved. This is accomplished by varying the lengths of the connecting segments, i.e. the segments between the nozzles and the branch liens.

More particularly, the nozzles can be located in two or more planes so that the spray cone of a nozzle from one plane is superimposed on the spray cone of the nozzle of another plane.

Important to the invention is the concept of a flow density which is defined here as a volume of the spray discharged by the nozzle per unit area of a plane through the spray cone. The volume is of course related to the number of droplets crossing that area. In the region of the nozzle, the flow density and thus the number of droplets per unit area, is comparatively large and falls off with the spread of the spray cone, i.e. with increasing distance from the nozzle.

According to the invention, a nozzle arrangement for the scrubbing column, which comprises a sump for collecting the scrubbing liquid, a baffle-free absorption zone and at least one nozzle plane above the absorption zone, comprises distributor branch pipes and nozzles whose spray cones overlap and wherein the nozzles are connected to the branch pipes by intermediate pipe sections. According to the invention, the nozzle distribution is controlled by the lengths and positions of the intermediate pipe segments based upon the following:

(a) flow density profiles are formed in predetermined cross sectional planes of the scrubbing column by the spray cones of the nozzles;

(b) in each of these cross sectional planes, the flow density profiles of different spray cones are superimposed on one another;

(c) the flow density profiles of different cross sectional planes are superimposed upon projection of them onto a one of said planes to form a flow density complete profile in said one plane over the entire cross section of the scrubbing column;

(d) the flow density complete profile is compared with a predetermined value; and (e) upon deviation of the flow density complete profile from said predetermined value, adjusting a position of at least one of said nozzles and repeating steps (a) through (d) until the flow density complete profile for the cross section of the scrubbing column has an approximately constant value up to a wall region of said cross section.

According to another feature of the invention, the distributor is disposed along an axis of symmetry of the scrubbing column or tower and the nozzles on both sides of the distributor are provided in mirror symmetrical relationship with respect to that symmetry axis.

The flow density complete profile characterizing the scrubbing liquid distribution in the absorption zone has in plan view a closed core region formed by substantially constant flow density values and a ring region surrounding this core region which decreases outwardly in terms of flow density value. The nozzles are preferably turned downwardly and can produce spray cones which are hollow, i.e. wherein the central portion of the spray cone is free from a spray, or which are full spray cones, i.e. Wherein the spray is generated across the entire cross section of each spray cone.

The invention is based upon the discovery that the spray cones taken individually are not the critical factor for ensuring effective absorption by the scrubbing liquid of toxic or noxious components from the gas stream in the scrubbing column or tower. Rather the critical factor is the flow density, i.e. the flow rate resulting from the spray cones in each cross sectional plane transverse to the spray cones and which overlap so that contributions at various locations in each plane may be the result of superimposition of two or more spray cones at each location. Each liquid volume contribution (per unit area) representing the flow density is superimposed upon others when all of the flow densities are projected onto one of the planes and that complete profile determines whether or not parts of the gas will remain unaffected by the scrubbing action.

The invention is based upon the following model: The absorption zone of the scrubbing column is comprised of N volume elements which extend from the scrubbing liquid sump to the first nozzle plane and are traversed by the gas in the longitudinal direction. If each of these N volume elements in a statistical way is supplied with the same number of liquid droplets (equivalent to the same flow density or liquid volume per unit area), a uniform scrubbing of the gas is ensured and at the gas outlet of the scrubbing column, there will be a uniform concentration distribution in the gas stream. Steps (a)–(e) provide a methodology, based upon this model for setting the positions of the nozzles and thus guarantee a nozzle assembly which will obtain the desired result of a uniform scrubbing of the gas without requiring, for example, excess liquid spraying close to the wall of the column. In fact, in practice it turns out that the liquid flow can be diminished toward the wall region if step (e) is satisfied.

BRIEF DESCRIPTION OF THE DRAWING

The above and other objects, features, and advantages will become more readily apparent from the following description, reference being made to the accompanying drawing in which.

SPECIFIC DESCRIPTION

Figure 7:
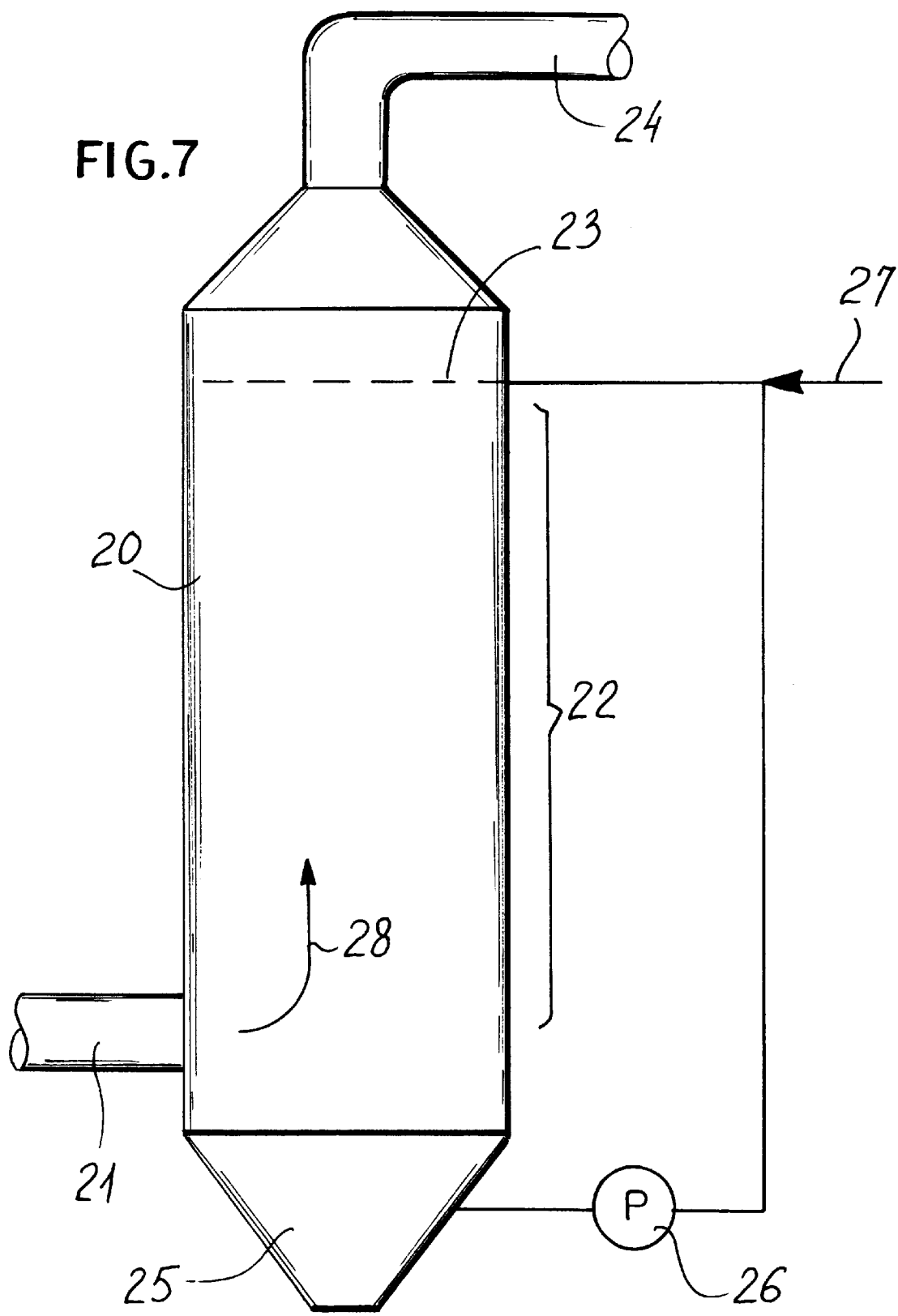
FIG. 7 is a cross sectional view through a scrubbing column according to the invention.

FIG. 7 shows a scrubbing column 20 having a flue gas inlet 21 for the flue gas to be desulfurized. The scrubbing column 20 has an absorption zone 22 free from baffles or packing, above which a nozzle arrangement 23 is provided, e.g. as described in FIGS. 1–3. At the head of the column, an outlet 24 is provided for the scrubbed gas and can lead to further gas cleaning equipment or to a stack. The scrubbing liquid is collected in a sump 25 and can be recirculated via a pump 26 to the nozzle assembly 23. Fresh scrubbing liquid can be added at 27. The scrubbing liquid can be a suspension of calcium carbonate or a solution of a substance capable of trapping sulfur compounds from the flue gas. Normally a system for regenerating the scrubbing liquid and/or separating solids therefrom can also be connected to the sump.

Figure 1:
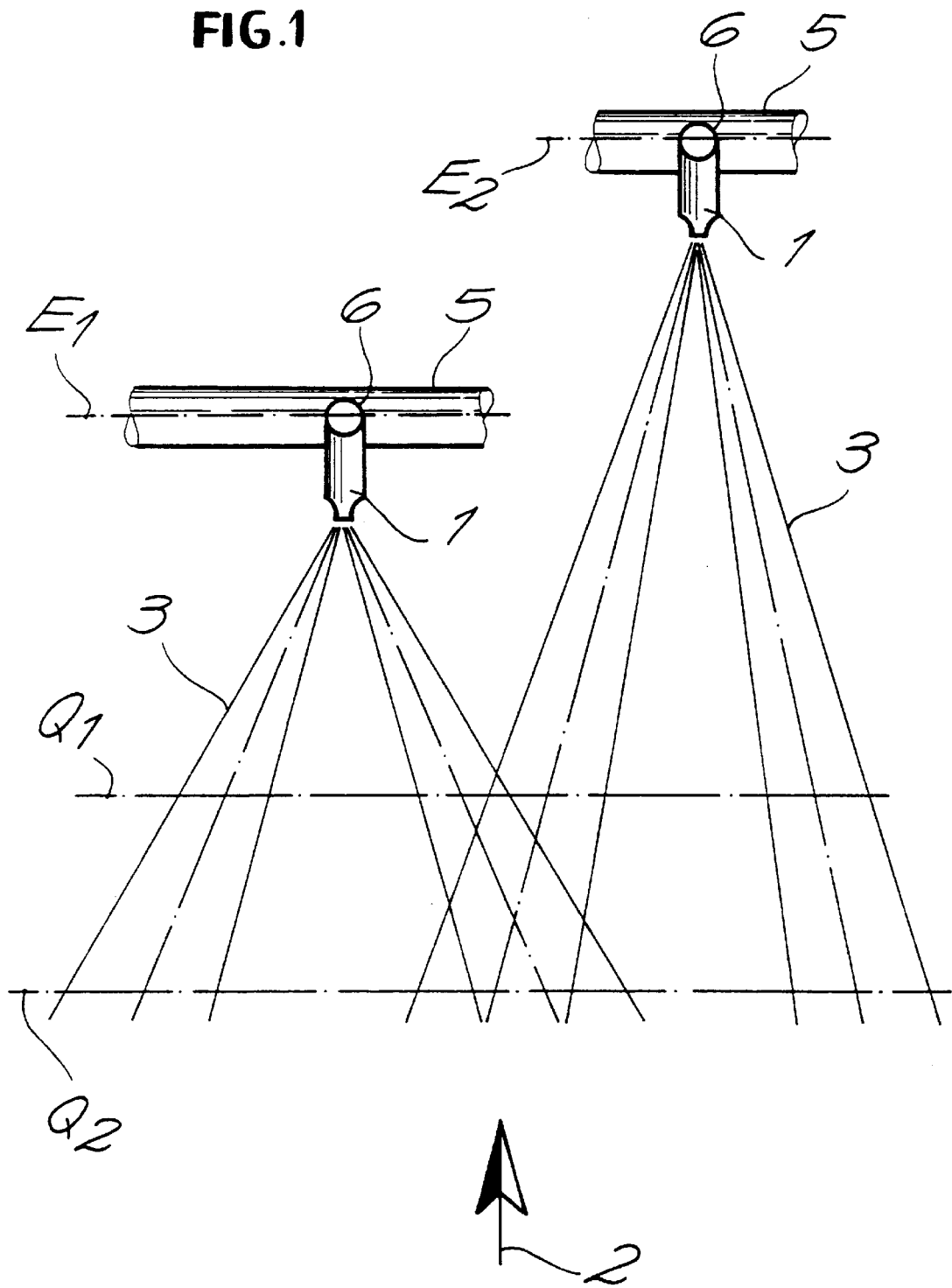
FIG. 1 is a diagram showing a nozzle assembly in which nozzles in two planes generate overlapping spray cones.

As can be seen from FIG. 1, the nozzles 1 of the nozzle assembly can be provided in one or more nozzle planes $E_1$, $E_2$ . . . above the absorption zone. The flue gas 2 to be scrubbed traverses the absorption zone in counter flow to the spray streams from the nozzles, i.e. from below upwardly as represented by the arrow 28 in FIG. 7. The nozzle arrangement comprises a large number of nozzles 1, only some of which have been designated by number in FIG. 3, with spray cones 3 which overlap as has been indicated in FIG. 1 highly diagrammatically. The spray cones in FIG. 1 are hollow spray cones.

Figure 2:
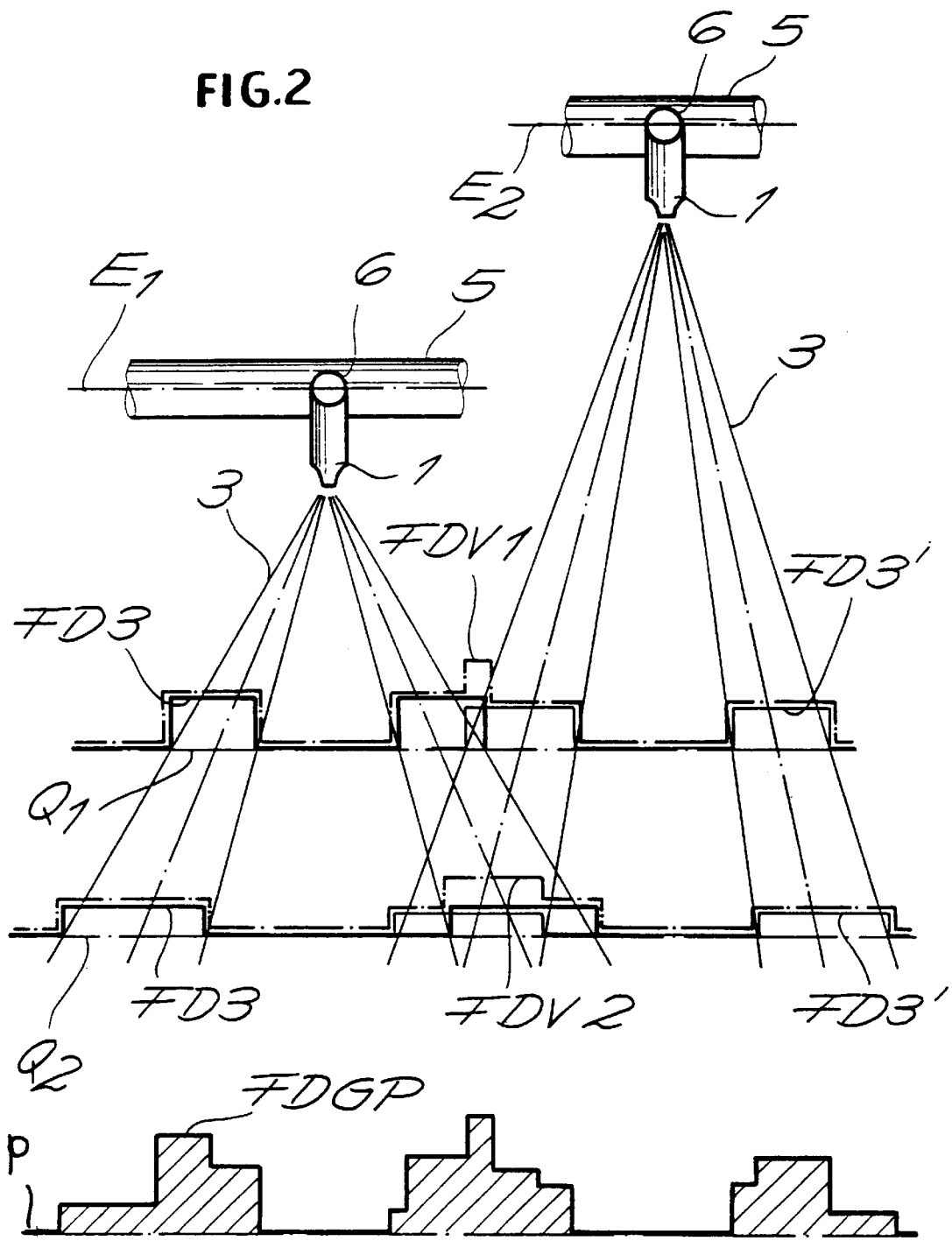
FIG. 2 is a diagram showing the flow density profile resulting from the overlapping spray cones of FIG. 1.

As will be apparent from a comparison of FIGS. 1 and 2, for each plane $Q_1$, $Q_2$ . . . of the column cross section, the spray cones have flow density profiles FD3, FD3', representing the volume of liquid flow per unit area or number of droplets of liquid per unit area and per unit time.

Where the spray cones overlap, in each cross sectional plane $Q_1$, $Q_2$ . . . , the flow density profiles FD3, FD3' are superimposed. The superimposed flow densities are referred to as flow density distributions FDV1, FDV2 . . . and are characteristic of each cross section plane. The flow density distributions FDV1, FDV2 . . . are projections on a plane, e.g. the plane P shown in FIG. 2 to form a flow density complete profile FDGP.

Figure 3:
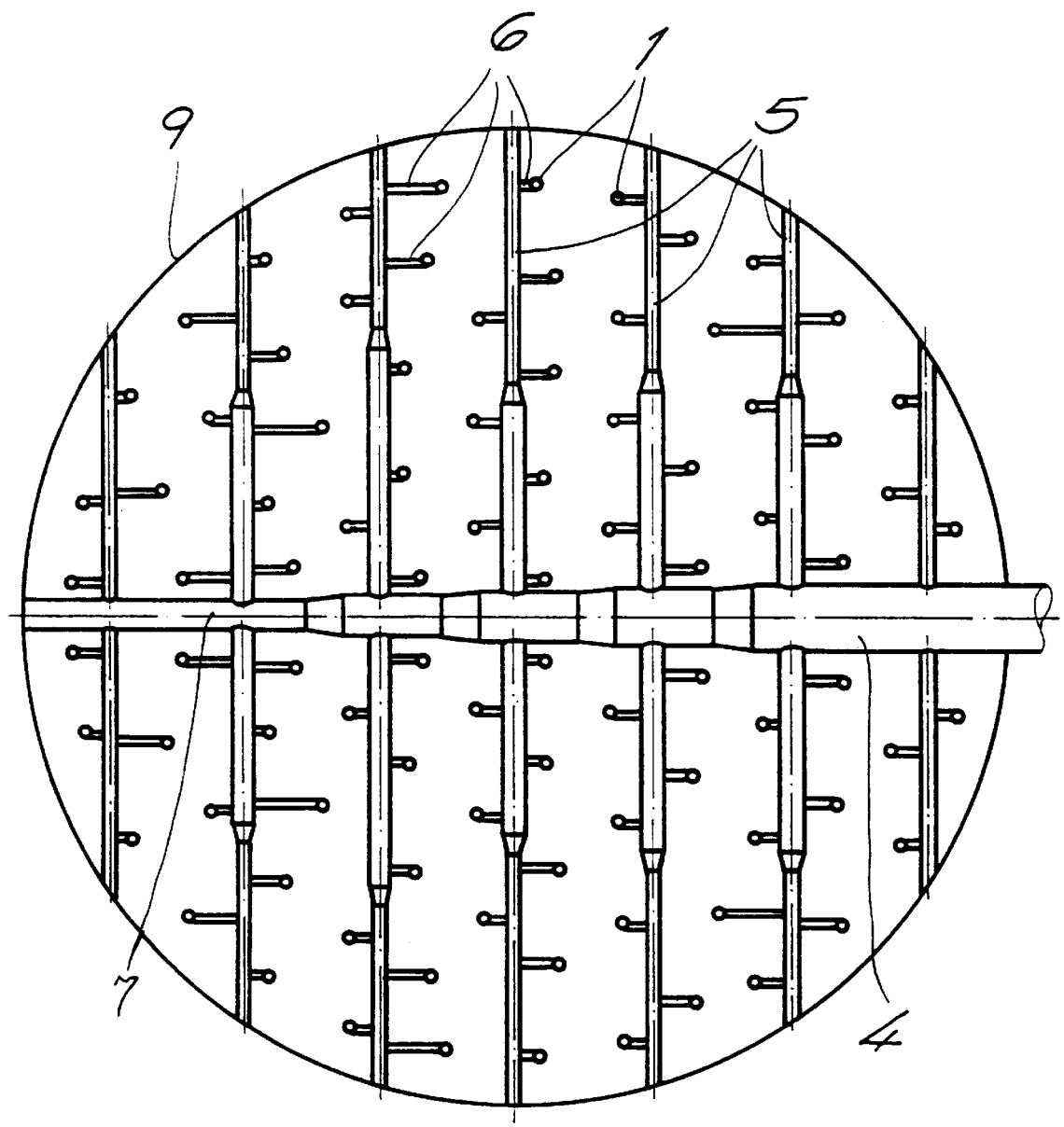
FIG. 3 is a plan view of a nozzle arrangement according to the invention showing the various positions of the nozzles resulting from the use of different intermediate pipe segment lengths and locations.

According to the invention the flow density complete profile FDGP is compared with a predetermined value and deviations from the predetermined value which are used to position are set with one or more nozzles 3 via the use of a respective intermediate pipe segment 6 so that the nozzles 1 will have a distribution substantially as shown in FIG. 3 on which the nozzles 1 are not uniformly distributed along the respective branch pipes 5 nor along the distributor 4, although they are located mirror symmetrically with respect to the plane of symmetry 7 of the cross section of the scrubbing column. The described steps are repeated until the flow density complete profile FDGP has a substantially constant value across the scrubbing column cross section and deviations from this constant value are minor. Some deviation in the region of the wall 9 of the scrubbing column must be permitted to allow a lower flow density in these regions and avoid excess spray of the scrubbing liquid in these regions.

The nozzles advantageously are connected by the intermediate pipe segments 6 to lateral branch pipes 5 with the lengths and positions of the intermediate segments 6 being so chosen as to provide the aforedescribed uniform complete profile. While symmetry is provided on opposite sides of the symmetry axis or plane 7, within each half of the scrubbing column cross section there is no such symmetry.

Figure 4:
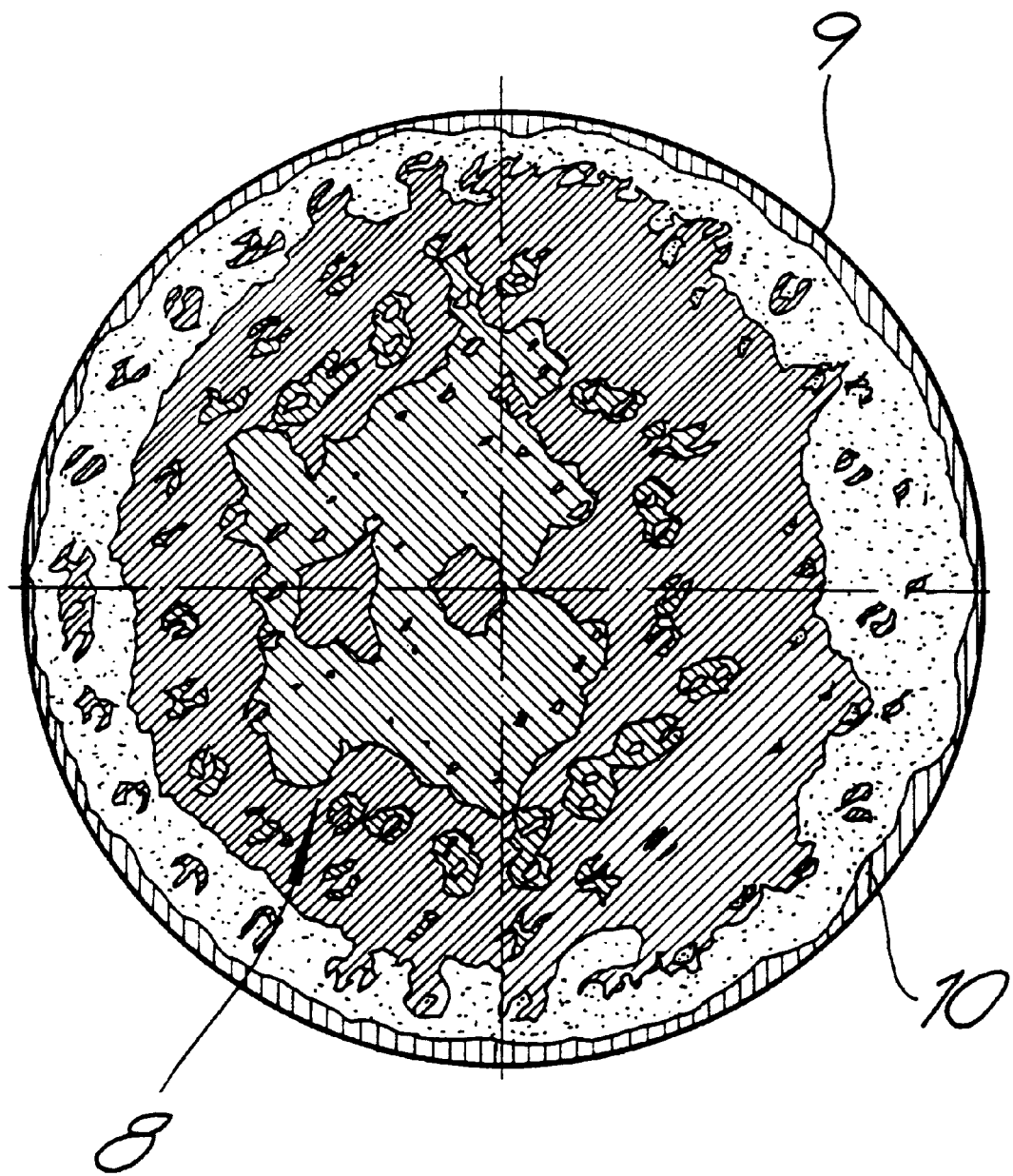
FIG. 4 is a diagram of the flow density complete profile resulting form the arrangement shown in FIG. 3 based upon the superimposition of the flow density distributions in the various planes of the scrubbing column.

The nozzle assembly as shown in FIG. 3 generates the flow density complete distribution or overall distribution pattern which has been illustrated diagrammatically at FIG. 4 with different forms of hatching or shading. The distribution is the characteristic flow density profile FDGP shown in a plan view and representing the projections of the flow densities in a single plane. It comprises a closed core area 8 of substantially constant flow density values and a region in the vicinity of the container wall 9 which has regions 10 from the core to the wall region 9 of downwardly decreasing flow density. In spite of these minor differences the flow density is generally constant across the cross section, at least up to the wall region of the column.

Figure 5:
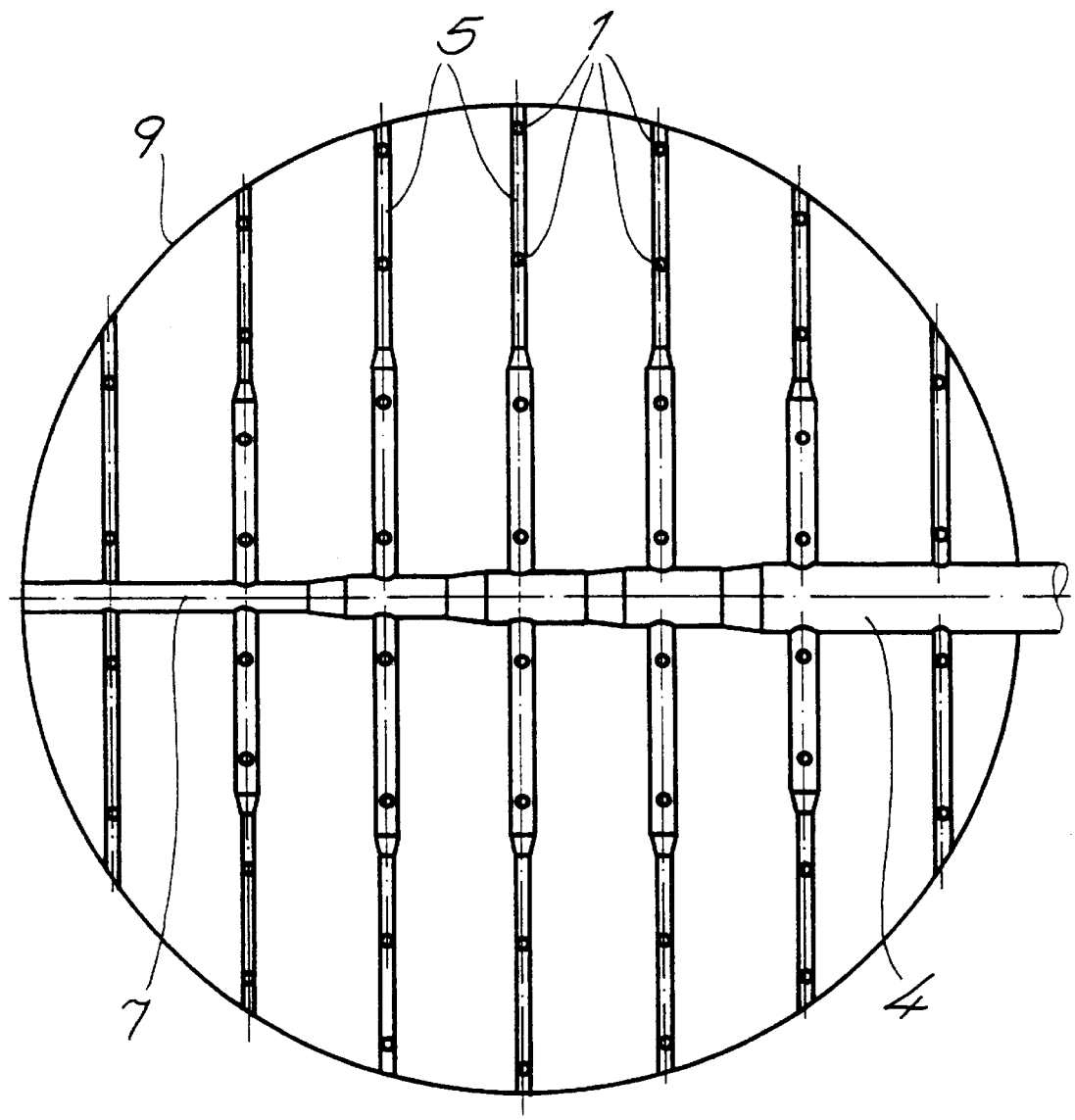
FIG. 5 is a diagram similar to FIG. 3 showing a nozzle arrangement of the prior art.
Figure 6:
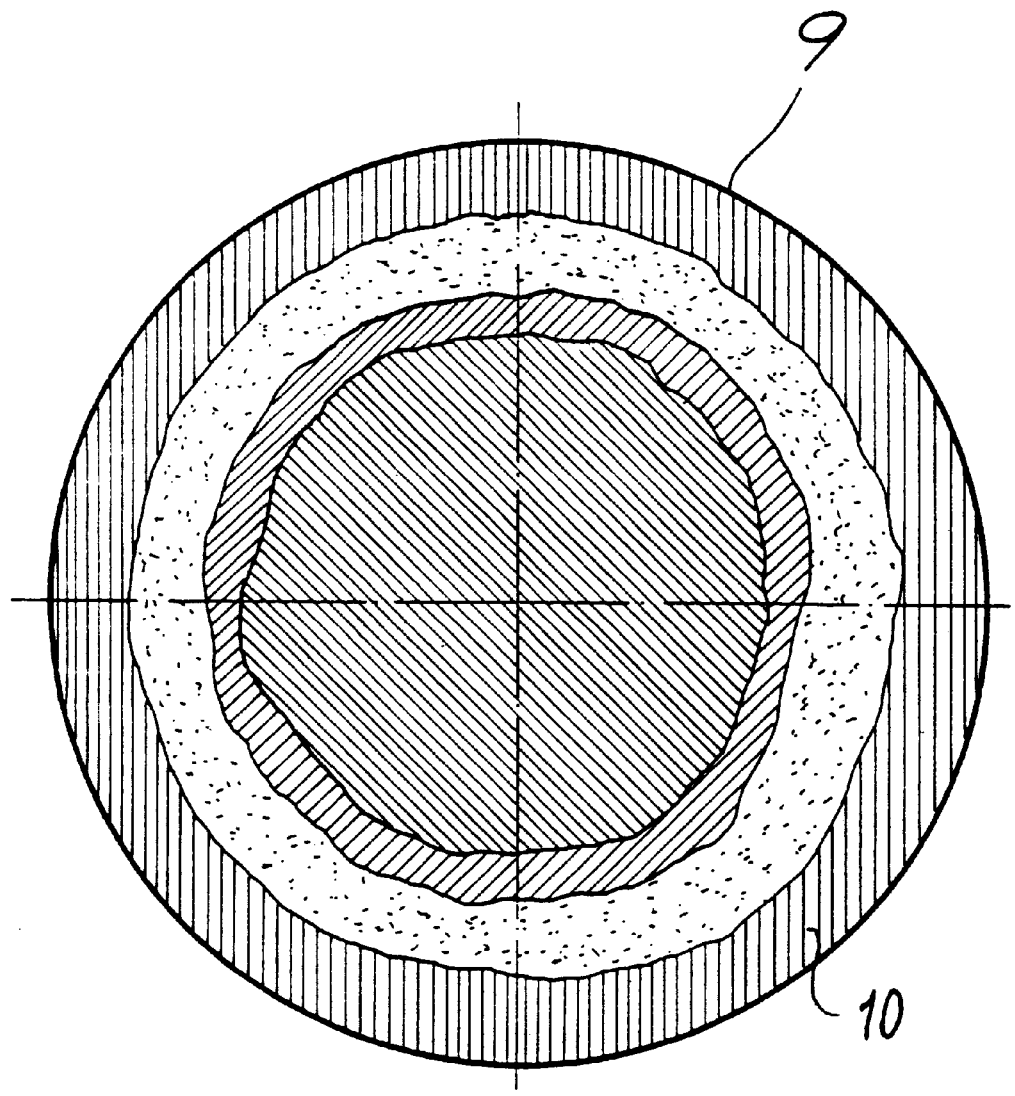
FIG. 6 is a diagram corresponding to that of FIG. 4 but for the nozzle arrangement of FIG. 5.

FIG. 5 shows, for comparison purposes, a conventional nozzle arrangement for a scrubber with its nozzles 1 located equidistantly along the branch lines 5 and generally connected to the branch lines 5 by very short intermediate pipe sections or none at all. This type of nozzle arrangement gives an equivalent flow density complete profile FDGP as shown in FIG. 6. In this case, the regions practically coaxially have marked flow density values differing significantly from one another. There are differing regions of higher flow density and low flow density directly adjoining one another and a wall region 10 which is of far greater thickness. In the zones of reduced flow density the removal of contaminants from the gas is incomplete. The gas leaving the scrubbing column has portions with high contaminant concentration.

The system of the invention optimizes the scrubbing of the gas and largely eliminates regions of the gas stream which can pass through the scrubber without having been subjected to the scrubbing liquid in an effective scrubbing step. The result is improved absorption efficiency.

I claim:

1. A nozzle arrangement for a scrubbing column which comprises a scrubbing liquid sump, a baffle-free absorption zone and at least one nozzle plane above said absorption zone and provided with a distributor for a scrubbing liquid, branch pipes connected to the distributor and downwardly directed nozzles connected to said branch pipes and having overlapping spray cones, the nozzles being laterally connected to the branch pipes by intermediate pipe segments, the lengths and positions of said intermediate pipe segments being selected in accordance with the following:

(a) flow density profiles are formed in predetermined cross sectional planes of the scrubbing column by the spray cones of the nozzles;
    (b) in each of these cross sectional planes, the flow density profiles of different spray cones are superimposed on one another;
    (c) the flow density profiles of different cross sectional planes are superimposed upon projection of them onto a one of said planes to form a flow density complete profile in said one plane over the entire cross section of the scrubbing column;
    (d) the flow density complete profile is compared with a predetermined value; and
    (e) upon deviation of the flow density complete profile from said predetermined value, a position of at least one of said nozzles is adjusted and steps (a) through (d) are repeated until the flow density complete profile for the cross section of the scrubbing column has an approximately constant value up to a wall region of said cross section.

2. The nozzle arrangement according to claim wherein the distributor lies along a symmetry axis of a cross section of said column and said nozzles being disposed mirror symmetrically on opposite sides of said symmetry axis.

3. The nozzle arrangement according to claim 2 wherein said flow density complete profile has a closed core area with a substantially constant flow density value and an annular region surrounding said core area with outwardly diminishing flow density value.

4. The nozzle arrangement according to claim 2 wherein said nozzles have downwardly directed hollow flow cones.

5. The nozzle arrangement according to claim 1 wherein said nozzles have downwardly directed spray cones with the spray completely filling said cones.

6. An apparatus for scrubbing flow gas to remove sulfur compounds therefrom, comprising:

a scrubbing column having a wall surrounding a cross section of said scrubbing column;
    means forming a liquid-collecting sump at a lower end of said column;
    means for admitting a flue gas to be scrubbed to said column above said sump, said column having a baffle-free absorption zone above said sump traversed upwardly by said flue gas;
    a nozzle arrangement disposed in at least one plane above said absorption zone for dispensing a scrubbing liquid into said flue gas for absorption of sulfur compounds therefrom, said nozzle arrangement being constructed in that:
        (a) flow density profiles are formed in predetermined cross sectional planes of the scrubbing column by the spray cones of the nozzles;
        (b) in each of these cross sectional planes, the flow density profiles of different spray cones are superimposed on one another;
        (c) the flow density profiles of different cross sectional planes are superimposed upon projection of them onto a one of said planes to form a flow density complete profile in said one plane over the entire cross section of the scrubbing column;
        (d) the flow density complete profile is compared with a predetermined value; and
        (e) upon deviation of the flow density complete profile from said predetermined value, a position of at least one of said nozzles is adjusted and steps (a) through (d) are repeated until the flow density complete profile for the cross section of the scrubbing column has an approximately constant value up to a wall region of said cross section; and
    means above said nozzle arrangement for discharging scrubbing flue gas from said scrubber.

7. A method of making a nozzle arrangement for a flue gas scrubber having a baffle-free absorption section below said nozzle arrangement and above a liquid collection sump, said method comprising the steps of:

(a) forming flow density profiles in predetermined cross sectional planes of the scrubbing column by spray cones from said nozzles;

(b) superimposing the flow density profiles of different overlapping spray cones in each of these cross sectional planes of different overlapping spray cones in each of these cross sectional planes on one another;

(c) forming a flow density complete profile in one of said planes by projecting flow density profiles of different cross sectional planes onto said one of said planes;

(d) comparing the flow density complete profile with a predetermined value; and (e) upon deviation of the flow density complete profile from said predetermined value, a position of at least one of said nozzles is adjusted and steps (a) through (d) are repeated until the flow density complete profile for the cross section of the scrubbing column has an approximately constant value up to a wall region of said cross section.

* * * * *